United States Patent Office 3,123,545
Patented Mar. 3, 1964

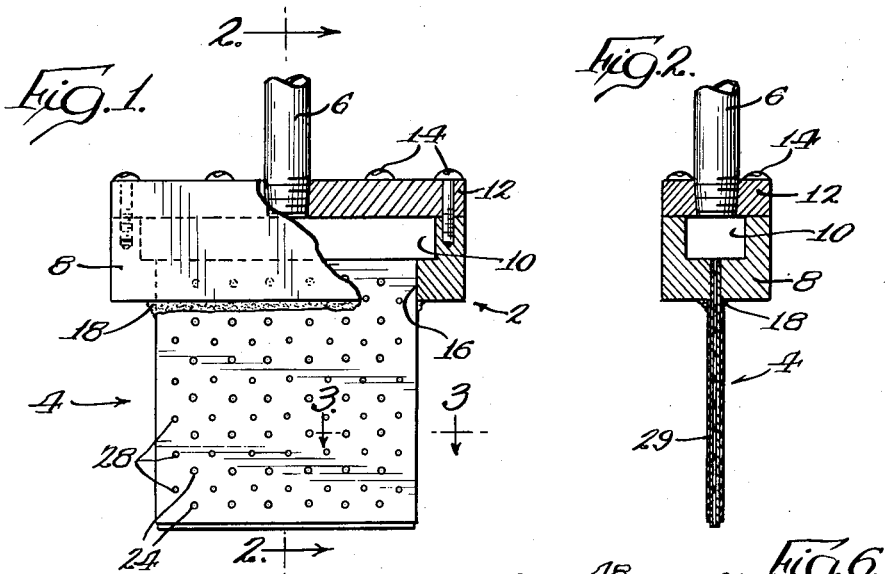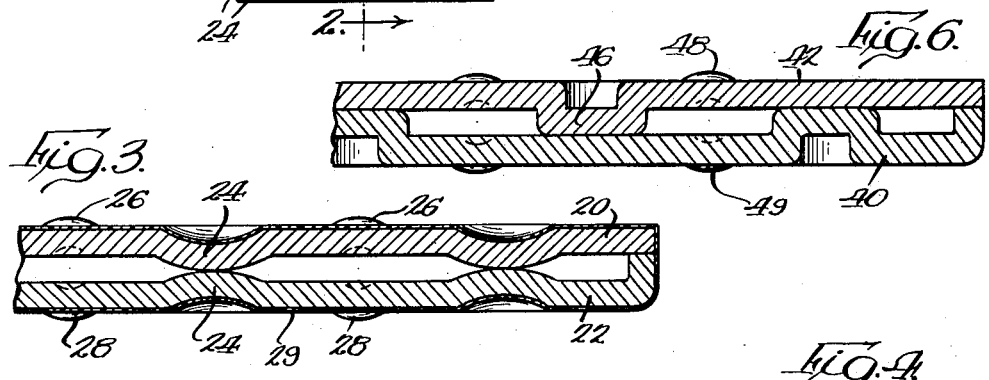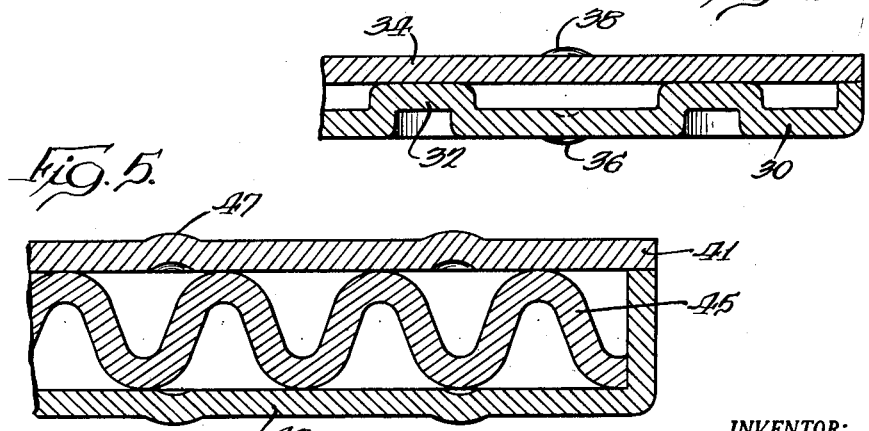

3,123,545
ELECTRODE FOR ELECTROLYTIC SHAPING
Lynn A. Williams, Winnetka, Ill., assignor to Anocut Engineering Company, Chicago, Ill., a corporation of Illinois
Filed June 13, 1960, Ser. No. 35,646
3 Claims. (Cl. 204—224)

This invention relates to the art of electrolytic removal of work material and more particularly to electrodes used in such applications.

This application is concerned primarily with electrodes which are very small in their transverse dimension. They may vary considerably in length. Electrodes of this type may be used for slotting and related applications, and the slots so formed may be long or short, annular or of irregular configuration and occasionally if desired of varying width. In each of these applications, the transverse dimension across the electrode is very small, for example as small as .015".

The structure of this application is an improvement over my copending application Serial No. 849,595, filed October 29, 1959, issued into Patent No. 3,019,178, dated January 30, 1962. The structure of my copending application is characterized primarily by a pair of spaced metallic elements which form a shell and a corrugated element disposed between the spaced elements forming a support means as well as a passage structure for electrolyte.

The structure of my copending application has been found to be very successful in the electrolytic slotting of materials. The improved structure of this application is characterized by an even more narrow electrode construction as well as one which is less expensive and subject to more simplified fabrication.

It is therefore a primary object of the present invention to provide an improved electrode for forming recesses which have a very narrow transverse dimension. In the preferred embodiment this is achieved by forming the electrode of two plates which are spaced from each other by means of dimpling one or both of the plates. The dimples provide a spacing through which the electrolyte may flow. The plates are then spot welded together. The plates are also dimpled outwardly to engage the recess walls to inhibit vibration and provide a passage for spent electrolyte.

It is therefore an object of the present invention to provide in a thin, light weight electrode an improved means for inhibiting electrode vibration.

Other objects and the many features of the invention will become apparent from the following description taken in conjunction with the accompanying drawings in which:

FIG. 1 is a side elevation view of the improved electrode partially broken away;

FIG. 2 is a view of the electrode along line 2—2 of FIG. 1;

FIG. 3 is a view along line 3—3 of FIG. 1 showing one form the electrode may take; and FIGS. 4, 5 and 6 are sectional views of other embodiments of the invention.

The electrode is used in apparatus for removing material from a conductive workpiece by electrolytic action. Reference may be had to my copending patent application Serial No. 772,960, filed November 10, 1958, for "Electrolytic Shaping," now Patent No. 3,058,895, for a description of a preferred form the apparatus may take. Briefly, such apparatus contemplates the use of an electrode as a cathode and the workpiece as an anode. The electrolyte is generally introduced into the work area between the workpiece and the electrode by way of the hollow electrode itself. The electrolyte under pressure enters the inner face between the tool and the workpiece, and as material is removed from the workpiece by electrolytic action, the electrode is advanced. Normally the work gap between the electrode and workpiece is kept constant to maintain the cutting action generally predominant in the direction of the cut. In such a situation side cutting action is reduced. However under some conditions, for example, when it is desired to taper the recesses, the work gap may be increased in size so as to cause the side cutting action to be greater.

It is highly advantageous to use high electrolyzing current densities, low voltages, high electrolyte pressure and flow rates throughout the work gap and to supply electrolyte to the work gap by way of passages formed within the electrode. It is also an advantage when smooth bottomed cavities are to be formed to provide an electrode wherein the electrolyte supply passages and effective electrode portions therebetween are small and closely interspersed at the electrode working face.

These preferred working conditions are difficult to accomplish in very thin electrodes of a type in which, for instance, the widest portion of the electrode may be no more than .015". This is particularly true if such an electrode is to be provided at a reasonable cost.

As seen in FIGS. 1 and 2 the improved electrode assembly comprises a generally rectangular electrode holder 2, an electrode 4 and an electrolyte supply pipe 6. The electrode holder 2 may be formed of a lower body portion 8 having a recess 10. A flat plate 12 is secured to the upper end of the body portion 8 by means of screws 14.

The supply pipe 6 is threaded at its lower end and is received in a corresponding threaded aperture in the plate 12. The supply pipe is in fluid conducting relationship with recess 10 which recess forms a reservoir for the electrolyte. The base of the body 8 is slotted at 16 to receive the narrow electrode 4. The electrode 4 is preferably welded to the base at 18 to provide a seal.

As best seen in FIG. 3, the electrode is comprised of a pair of generally flat, rectangular plates 20 and 22. Each of the plates includes a plurality of dimples 24 in alignment with dimples on the opposing plate. The opposing dimples are preferably spot welded together to prevent separation of the plates under the high pressure of the electrolyte. In some instances the electrolyte pressure will be as high as 150 to 200 pounds per square inch.

The dimples are preferably spaced close together. For example, a spacing of 1/8 inch on centers vertically and horizontally for plates having a thickness in the order of .005" has been found to be satisfactory. This close spacing of the dimples also aids in preventing swelling or separation of the plates from each other due to the force of the high pressure electrolyte. With a .005" plate thickness and .005" plate spacing, an electrode having a thickness in the order of .015" may be formed.

In the preferred embodiment the outer end of one of the plates, 22 in this instance, is bent over at right angles and joined to the other plate, preferably by welding. The edges of the joint between the two plates are preferably substantially flush leaving as little bead as possible.

Each of the plates is also dimpled outwardly at 26 and 28. The dimples 26 and 28 may be aligned in vertical and horizontal rows staggered with respect to the dimples 24 as shown in FIG. 1. The purpose of these outwardly extending dimples is to eliminate or to at least substantially limit vibration which exists in thin electrodes of this type. This tendency to flutter or vibrate is normally caused by the high pressure electrolyte passing through the very thin light weight electrode structure.

These dimples are preferably made in the order of .001" beyond the surface of the plates. The purpose of the dimples is to make very light engagement with the side wall of the cavity which is formed. While it is not intended that the electrode should have to be forced into the cavity which it cuts, it will not be harmful if this occurs to some slight degree. However it must not be of such magnitude as to cause the insulation to wear off or break off.

Because the side walls are thin it might be expected that the outwardly extending dimples will be pushed inwardly a slight amount without requiring any very great force. However in normal working, the voltage of the system and the speed of advance together with the amount of exposure at the lip will be so adjusted that the width of the slot which is cut will just clear the portions of the electrode where the upraised dimples are standing.

A thin layer of insulation 29 covers the sides and side edges of the electrode 4 preferably to within approximately .025" of the working edge to permit enough electrolytic side action to assure clearance between the insulation and the wall of the cavity formed.

It will be appreciated of course that the insulation will cover the dimples so that there is no metal to metal contact with the workpiece. There is some tendency for some types of insulating material to accumulate with slightly greater thickness on the dimples so that even when their height is only .001" or .002", it may be somewhat increased by the insulation. With other types of insulation, however, the opposite effect will exist; and the insulation may be attenuated at the peaks of the dimples. In this case it will be necessary to strike them to a slightly greater height. The dimples in addition to providing means for limiting the amplitude of vibration on the electrode will also define channels with the adjacent workpiece wall for the removal of the electrolyte.

The lower row of dimples should not be closer to the working edge or lip of the electrode than approximately $\frac{1}{16}''$.

It will be appreciated that this idea of using outwardly extending dimples may be also utilized in the sandwich type construction using corrugated members which is shown and described in my copending application. FIG. 5 illustrates this feature. This electrode comprises plates 41 and 43 with dimples 47. A corrugated member 45 is welded to the plates to prevent bulging and to provide an electrolyte passage.

The electrode construction of FIG. 4 is otherwise similar to that of FIG. 3 except that the inwardly extending dimples 32 are all on one plate 30. The height of these dimples is twice that of the corresponding dimples in FIG. 3. These dimples engage the opposite plate 34 and are spot welded thereto. The plates 30 and 34 include outwardly extending dimples 36 and 38.

FIG. 6 shows a construction in which the plates 40 and 42 are each formed with staggered inwardly directed dimples 44 and 46 similar in height to dimples 32 of FIG. 4. The dimples are spot welded to the opposite plate. Since these dimples are staggered, they will be twice the height of those shown in FIG. 3 to provide the same spacing. The plates 40 and 42 are also provided with outwardly extending dimples 48 and 49 to inhibit flutter. The insulation 29 (FIG. 2) would also be applied to the electrodes of FIGS. 4–6 in their finished form. In the method of electrolytically shaping a metallic workpiece, a voltage is impressed across the workpiece and a metallic electrode so as to make the workpiece anodic and the electrode cathodic and an electrolyte is passed between the workpiece and electrode, whereby an electric current flow is established between the workpiece and electrode to remove material from the former. In the electrode of the present invention, the greater portion of the electrode is covered with insulating material, only one edge or end of the electrode being exposed (e.g., not covered with insulating material), whereby the current flow between the workpiece and electrode is limited to the area immediately adjacent the exposed edge of the electrode. In the claims, the words "working edge" mean this exposed edge, the area adjacent which the current flow is limited.

While there has been described what is believed to be the preferred embodiment of the present invention, it will be appreciated that various changes and modifications may be made therein; and it is contemplated to cover in the appended claims all such changes and modifications as fall within the true spirit and scope of the invention.

What is claimed as new and desired to be secured by United States Letters Patent is:

1. An electrode for electrolytic cavity forming having an electrolyte inlet and an outlet comprising a pair of opposed metallic plates, dimples formed in close proximity to each other in at least one of the plates and projecting into engagement with and secured to the other plate to prevent bulging of the plates under high internal hydraulic pressures, the side edges of the plates being joined to form a passage around the dimples for electrolyte extending from the inlet to the outlet, outwardly extending dimples on the plates adapted to permit light engagement of the electrode with the cavity sides to inhibit electrode vibration and provide an outlet passage for spent electrolyte, an insulating material intimately covering the sides and side edges of the plates, and means supporting the plates at the inlet and adapted to supply electrolyte under pressure thereto, the plates being exposed at the outlet to define an electrode working edge.

2. An electrode for electrolytic cavity forming having an electrolyte inlet and an outlet comprising a pair of opposed metallic plates each having a thickness in the order of .005", dimples formed with a spacing in the order of $\frac{1}{8}''$ on centers in at least one of the plates and projecting into engagement with and secured to the other plate to prevent bulging of the plates under high internal hydraulic pressures, the side edges of the plates being joined to form a passage around the dimples for electrolyte extending from the inlet to the outlet, dimples on the plates extending outwardly a distance in the order of .001" adapted to permit light engagement of the electrode with the cavity walls to inhibit electrode vibration and provide an outlet passage for spent electrolyte, a thin insulating material coating on the sides and side edges of the plates, and means supporting the plates at the inlet and adapted to supply electrolyte under pressure thereto, the plates being exposed at the outlet to define an electrode working edge.

3. An electrode for electrolytic cavity forming having an electrolyte inlet and an outlet comprising a pair of opposed metallic plate sections, means securing the plate sections together in positions in close proximity to each other to prevent bulging of the plates under high internal hydraulic pressures, the side edges of the plate sections being joined to form a passage for electrolyte extending from the inlet to the outlet, outwardly extending dimples on the plate sections adapted to permit light engagement of the electrode with the cavity walls to inhibit electrode vibration and provide an outlet for spent electrolyte, a thin insulating material coating on the sides and side edges of the plate sections, and means supporting the plate sections at the inlet and adapted to supply electrolyte under pressure thereto, the plates being exposed at the outlet to define an electrode working edge.

References Cited in the file of this patent

UNITED STATES PATENTS

| | | |
|---|---|---|
| 1,874,111 | Mershon | Aug. 30, 1933 |
| 1,954,015 | Lipman | Apr. 10, 1934 |
| 2,073,356 | Torchet | Mar. 9, 1937 |
| 2,156,544 | Raskin | May 2, 1939 |
| 2,215,102 | Hesse | Sept. 17, 1940 |
| 2,445,801 | Partiot | July 27, 1948 |
| 2,672,958 | Pierce | Mar. 23, 1954 |
| 3,019,178 | Williams | Jan. 30, 1962 |

FOREIGN PATENTS

| | | |
|---|---|---|
| 335,003 | Great Britain | Sept. 18, 1930 |

Dedication 3,123,545.—*Lynn A. Williams*, Winnetka, Ill. ELECTRODE FOR ELECTROLYTIC SHAPING. Patent dated Mar. 3, 1964. Dedication filed Dec. 23, 1971, by the assignee, *Anocut Engineering Company*.

Hereby dedicates to the Public the portion of the term of the patent subsequent to Dec. 24, 1971.

[*Official Gazette March 21, 1972.*]